(12) United States Patent
Mack

(10) Patent No.: US 12,679,705 B2
(45) Date of Patent: Jul. 14, 2026

(54) SAFETY CASTER ASSEMBLY

(71) Applicant: Stacey W. Mack, Hanover, PA (US)

(72) Inventor: Stacey W. Mack, Hanover, PA (US)

( * ) Notice: Subject to any disclaimer, the term of this patent is extended or adjusted under 35 U.S.C. 154(b) by 515 days.

(21) Appl. No.: 18/189,549

(22) Filed: Mar. 24, 2023

(65) Prior Publication Data

US 2024/0317552 A1     Sep. 26, 2024

(51) Int. Cl.
*B66F 7/06*          (2006.01)
*B60B 33/00*          (2006.01)
*B66F 11/00*          (2006.01)

(52) U.S. Cl.
CPC ........ *B66F 7/0625* (2013.01); *B60B 33/0018* (2013.01); *B60B 33/0068* (2013.01); *B66F 11/00* (2013.01); *B62B 2301/05* (2013.01)

(58) Field of Classification Search
CPC .... B66F 7/0625; B66F 11/00; B60B 33/0018; B60B 33/0068; B62B 5/0083; B62B 5/0086; B62B 5/0089; B62B 2301/05; F16B 2200/63
See application file for complete search history.

(56) References Cited

U.S. PATENT DOCUMENTS 1,310,498 A * 7/1919 Borkey ................ B66F 7/0625
                                                 254/133 R
3,480,292 A * 11/1969 Borkey ................ B62B 5/0089
                                                 280/43.17
5,822,829 A * 10/1998 Webb ..................... B60B 33/00
                                                 16/34

5,988,598 A * 11/1999 Sicking ............... E01F 15/0461
                                                 256/DIG. 5
8,303,209 B2 * 11/2012 Lewis ..................... E01F 9/635
                                                 40/607.1
8,517,343 B1 * 8/2013 VanValkenburgh ..... B62H 3/06
                                                 254/8 R
8,628,059 B2 * 1/2014 Hetrick .................... A63B 7/00
                                                 254/8 R
11,968,798 B2 * 4/2024 Shurhay ............... H05K 5/0234
2025/0083932 A1 * 3/2025 Brouillette ................ B66F 7/04

FOREIGN PATENT DOCUMENTS

EP            0879787 A2 * 11/1998    ............. B66F 15/00

OTHER PUBLICATIONS

Tuxedo Distributors, LLC, FP8K-B, FP8K-DX & FP8K-DX-XLT Four Post Storage Lifts Installaion / Owner's Manual, Jun. 2017 (Year: 2017).*
Bendpak, Portable Caster Kit flyer, retrieved from www.bendpak.com/car-lifts/accessories/casster-kit/; Copyright 2022 (Year: 2022).*

* cited by examiner

*Primary Examiner* — Steve Clemmons
(74) *Attorney, Agent, or Firm* — Barley Snyder

(57)          ABSTRACT

A safety caster assembly comprising a beam assembly. The beam assembly having a pair of side plates. The safety caster assembly further comprising a safety mechanism assembly. The safety mechanism assembly having a pair of shear plates and each shear plate of the pair of shear plates has a bolt receiver corresponding to the slot. The safety caster assembly further comprising a wheel assembly. The safety caster assembly further comprising a structural cradle assembly. The structural cradle assembly having a mount. The structural cradle assembly further having a cradle positioned on the mount. The safety caster assembly having a fastener assembly.

16 Claims, 23 Drawing Sheets

202

208

206

202

208

206

SAFETY CASTER ASSEMBLY

FIELD OF THE INVENTION

The present invention relates to a caster assembly, more particularly, to a safety caster assembly that permits the safe transportation of a stationary automobile lift.

BACKGROUND

As a general matter, portable automobile lifts are available to permit transporting of an automobile lift from one place to the next. However, these lifts do not provide a safety feature that can prevent injury or even death when an excessive load is applied to the automobile lift.

It is desirable to provide a safety caster assembly that has the mobility of transporting a heavy automobile lift while including a safety aspect to prevent moving an excessive load.

As the foregoing illustrates, the invention provides the safety caster assembly that permits safe transportation of a stationary automobile lift while providing a safety aspect to prevent an excessive load from being transporting on the automobile lift.

SUMMARY

A safety caster assembly comprising a beam assembly. The beam assembly having a pair of side plates. Each of the side plate of the pair of side plates having a slot. The beam assembly further having a plurality of cross section plates. The safety caster assembly further comprising a safety mechanism assembly. The safety mechanism assembly having a pair of shear plates and each shear plate of the pair of shear plates has a bolt receiver corresponding to the slot. The safety caster assembly further comprising a wheel assembly. The wheel assembly having a structural plate positioned between each side plate of the pair of side plates. The wheel assembly further having a wheel support positioned and coupled to a bottom of the structural plate. The wheel assembly further having a free floating wheel coupled to a lower portion of the wheel support. The safety caster assembly further comprising a structural cradle assembly. The structural cradle assembly having a mount. The structural cradle assembly further having a cradle positioned on the mount. The safety caster assembly having a fastener assembly. The fastener assembly having a bolt positioned through the bolt receiver and the slot.

BRIEF DESCRIPTION OF DRAWINGS

In the following, the present invention is described in more detail with references to the drawings in which.

DETAILED DESCRIPTION OF THE EMBODIMENTS

Figure 1:
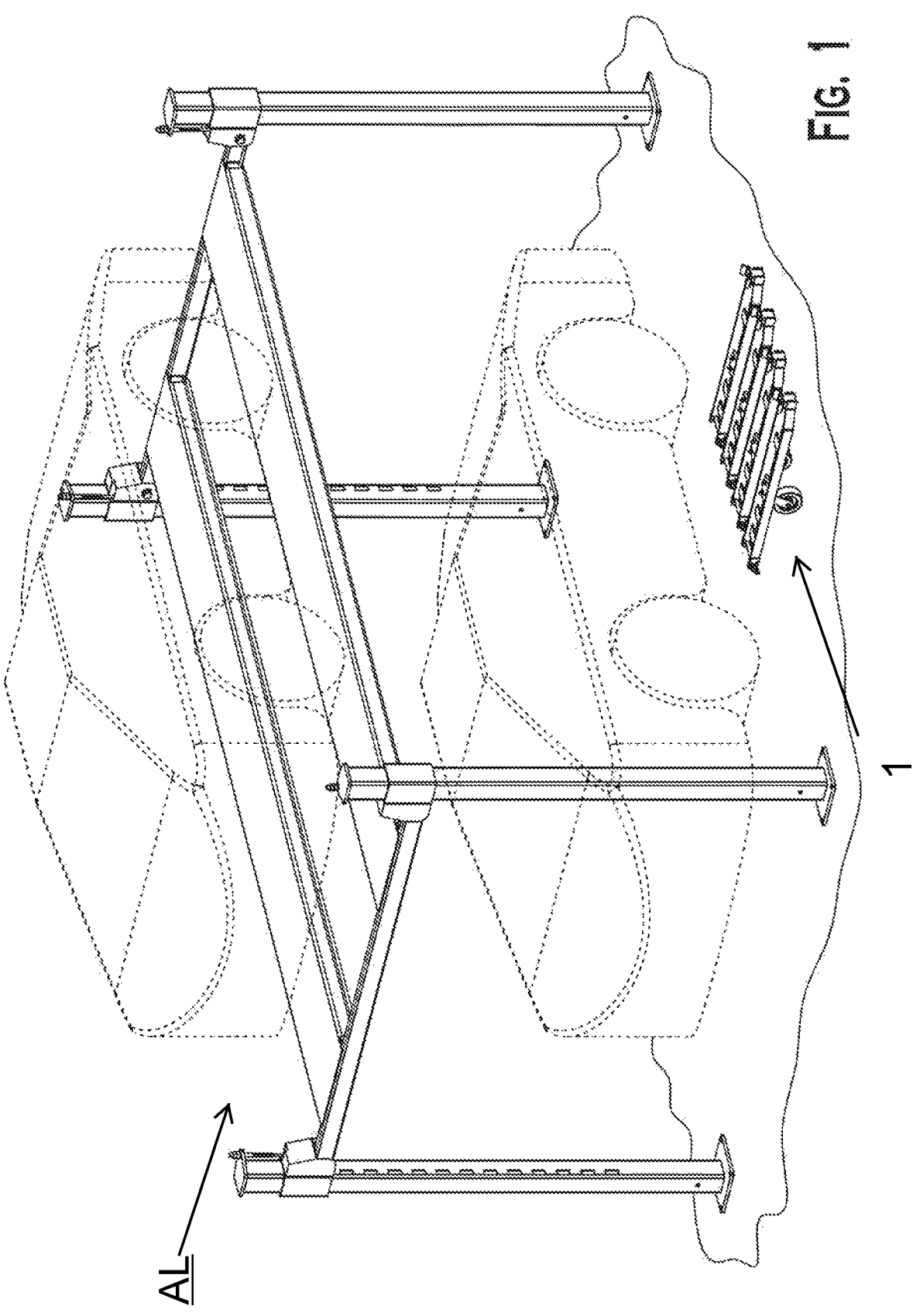
FIG. 1 is a perspective view of the safety caster assembly, as assembled.

The present disclosure includes a safety caster assembly 1 according to the invention. In the exemplary embodiment, the safety caster assembly 1 has a beam assembly 2, a safety mechanism assembly 4, a wheel assembly 6, a structural cradle assembly 8 and a fastener assembly 10.

Figures 2, 3:
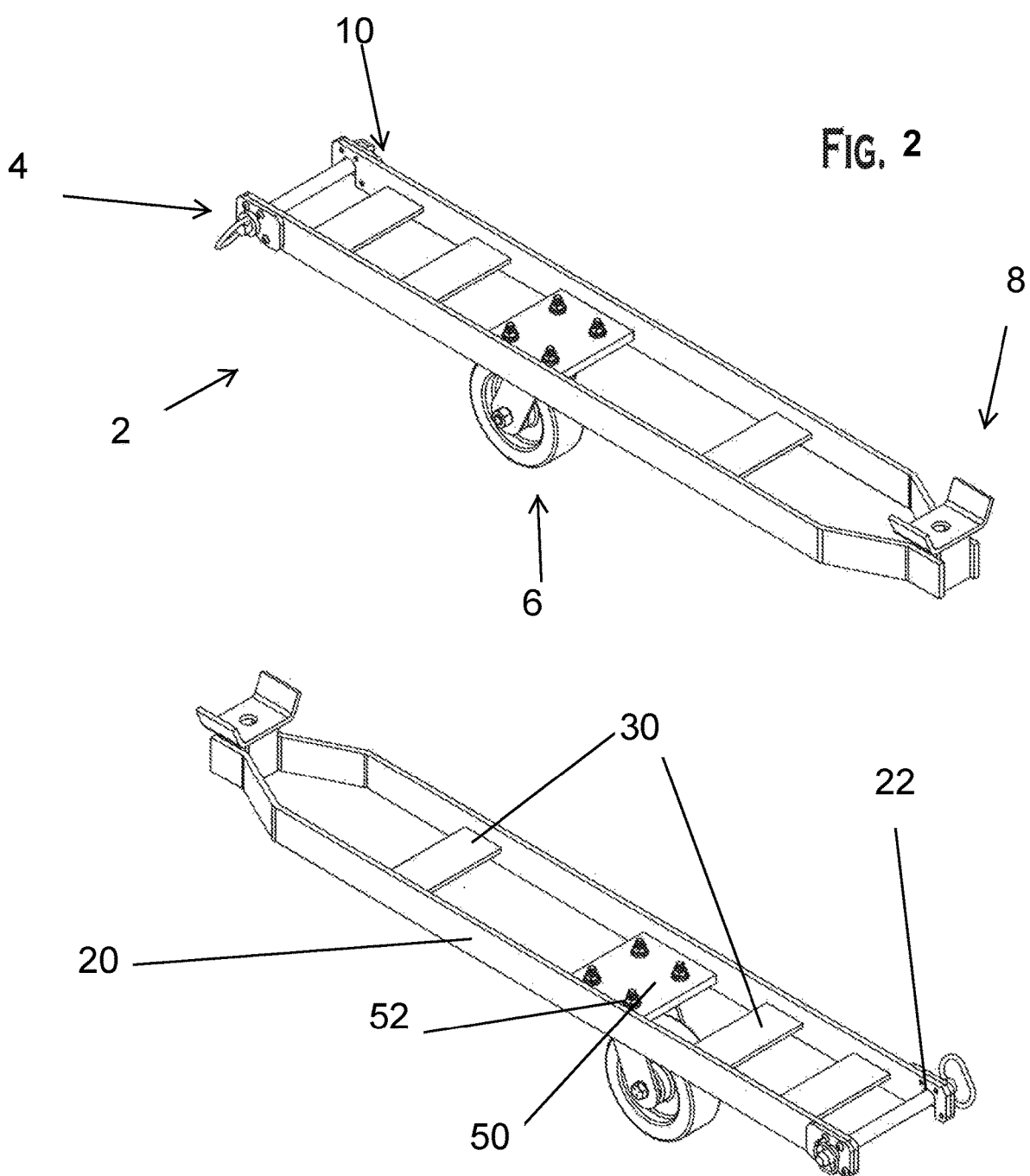
FIG. 2 is a front, top, right side view of the invention of FIG. 1.
FIG. 3 is a rear, top, left side view of the invention of FIG. 2.
Figures 4, 5:
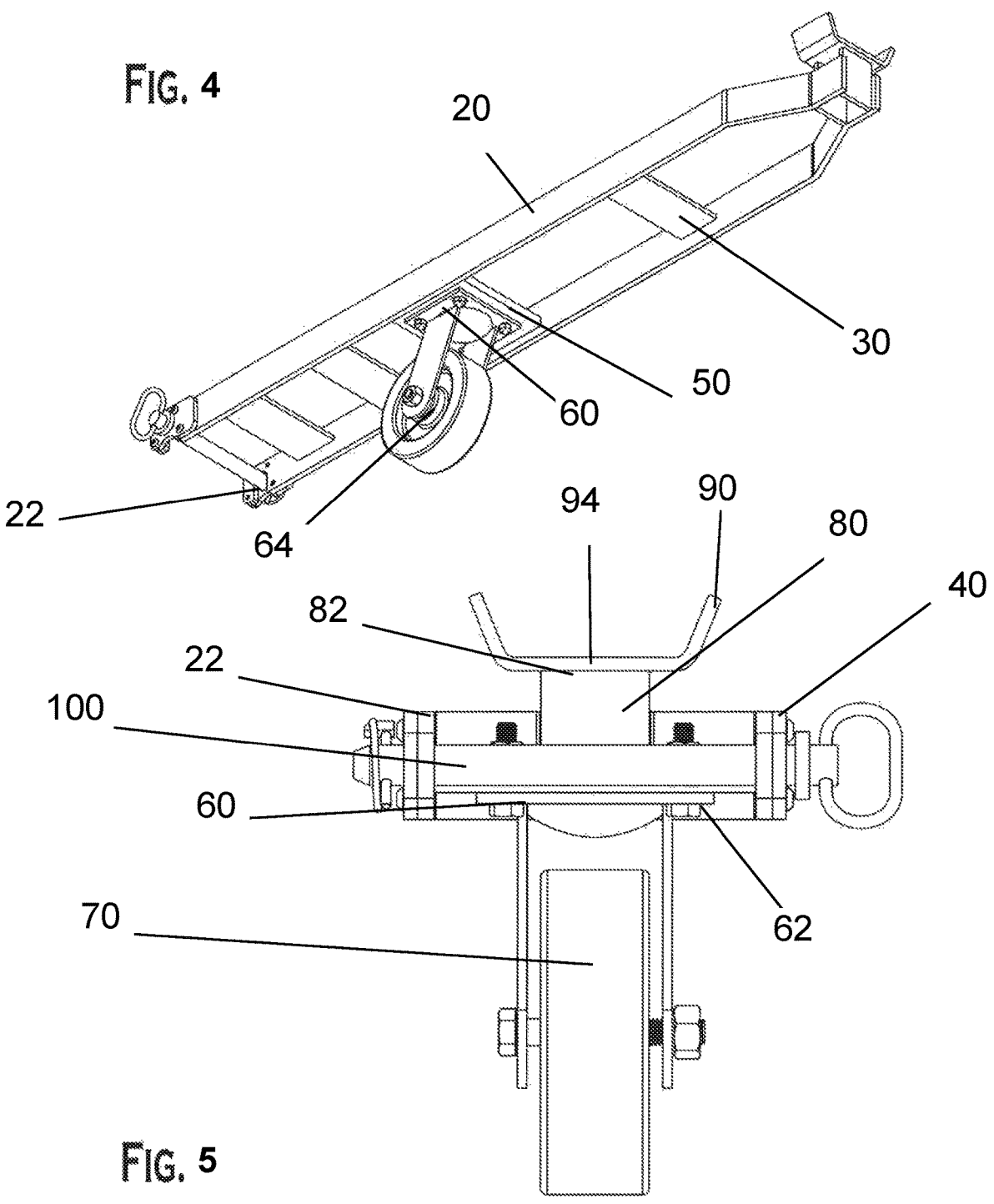
FIG. 4 is a front, bottom, right side view of the invention of FIG. 3.
FIG. 5 is a rear view of the invention of FIG. 4.
Figures 6, 7:
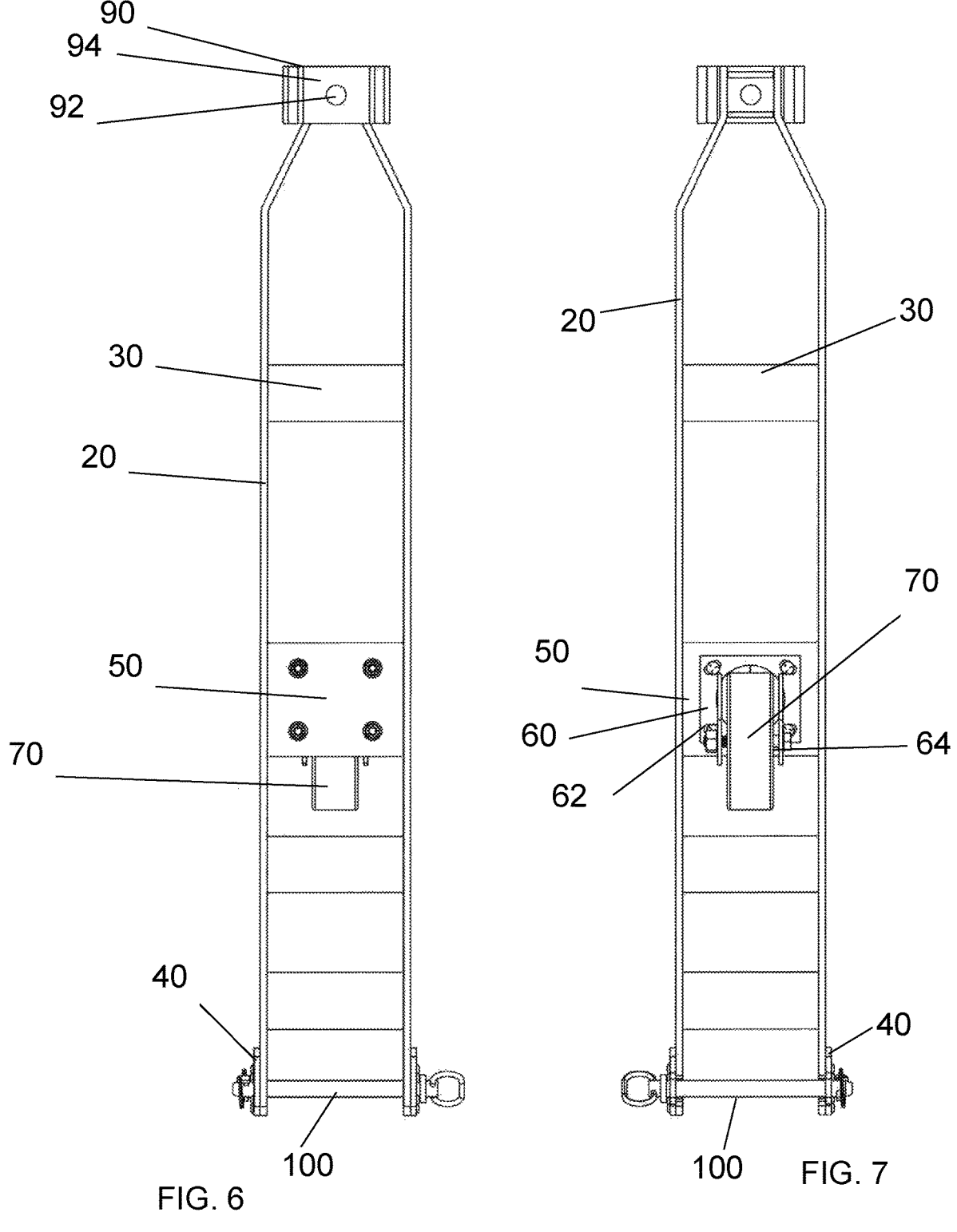
FIG. 6 is a top view of the invention of FIG. 5.
FIG. 7 is a bottom view of the invention of FIG. 6.
Figures 8, 9, 10:
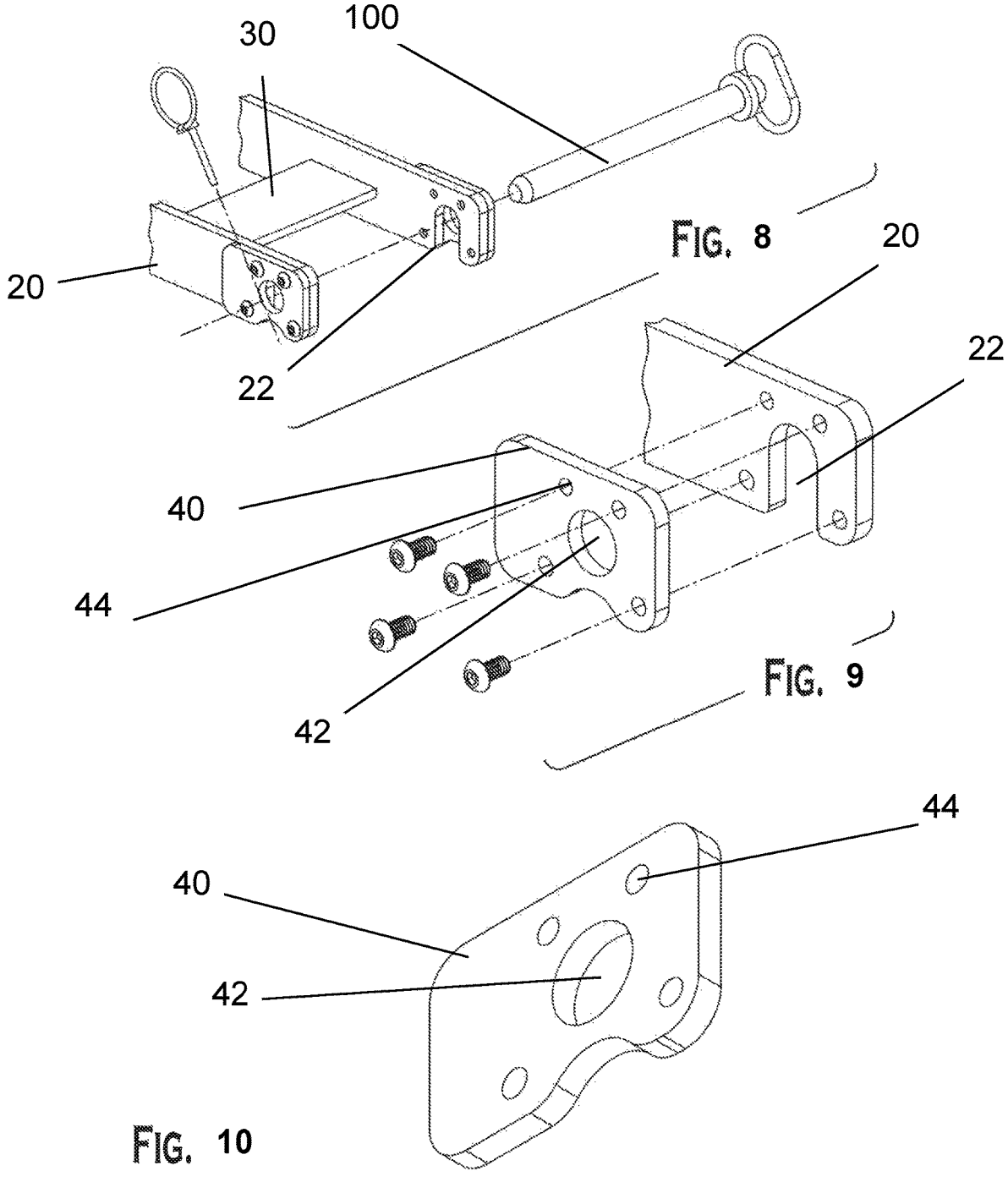
FIG. 8 is an exploded view of the invention of FIG. 7.
FIG. 9 another exploded view of the invention of FIG. 8.
FIG. 10 is an isolation view of the invention of FIG. 9.
Figures 11, 12, 13, 14, 15:
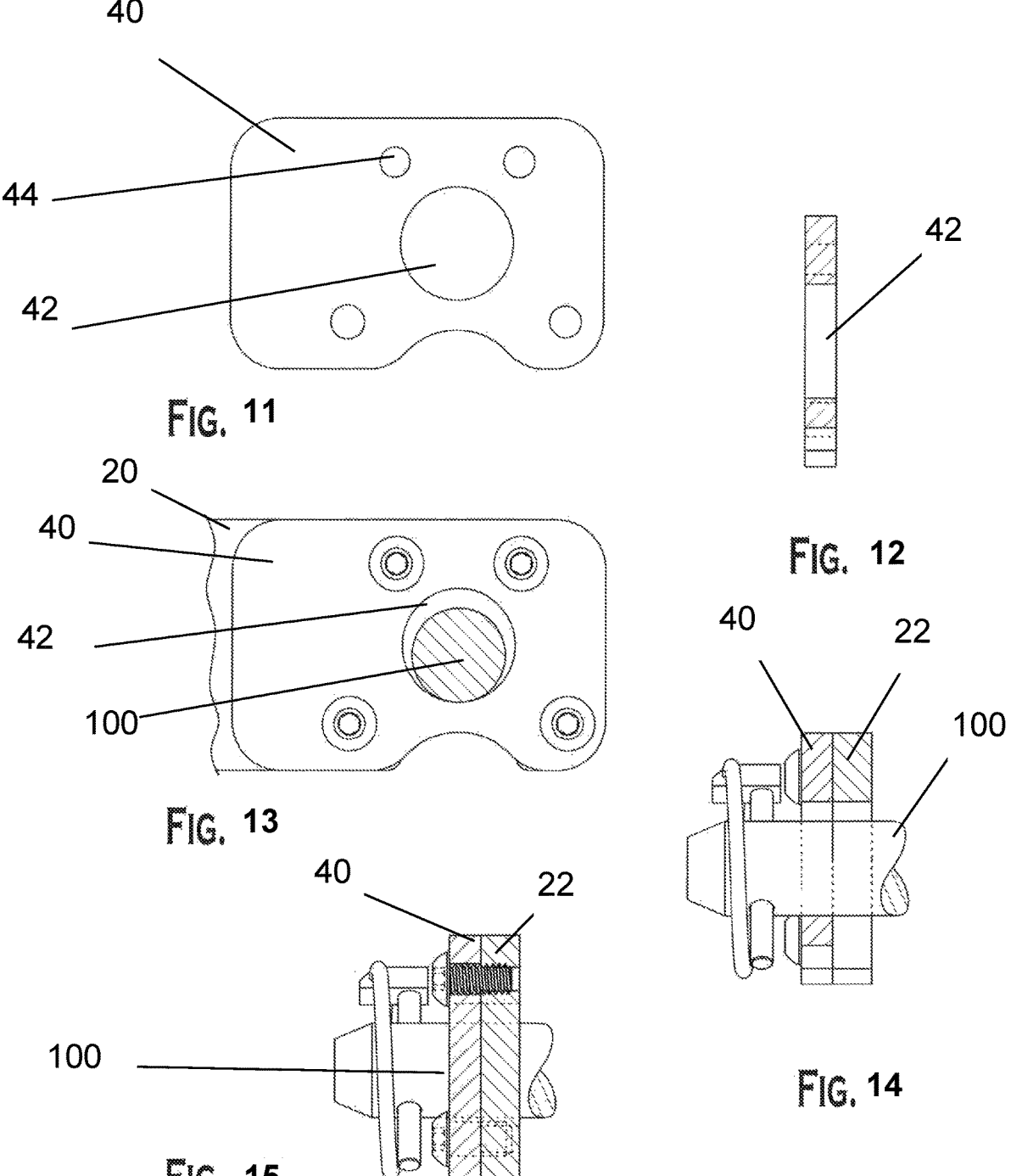
FIG. 11 is another isolation view of the invention of FIG. 10.
FIG. 12 is a cross sectional view of the invention of FIG. 11.
FIG. 13 is another isolation view of the invention of FIG. 12.
FIG. 14 is another cross sectional view of the invention of FIG. 13.
FIG. 15 is another cross sectional view of the invention of FIG. 14.
Figure 16:
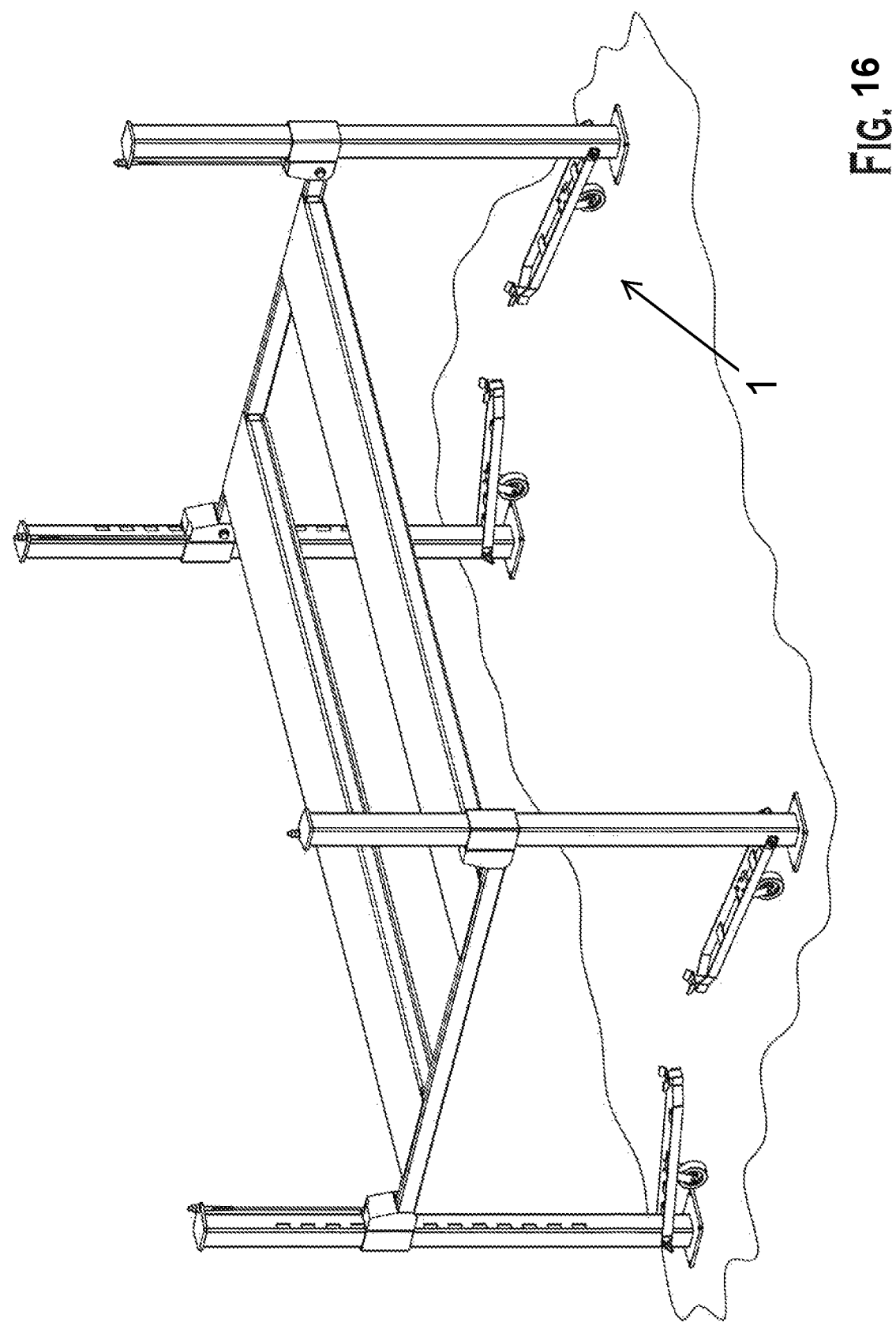
FIG. 16 is a perspective view of the invention of FIG. 15.
Figure 17:
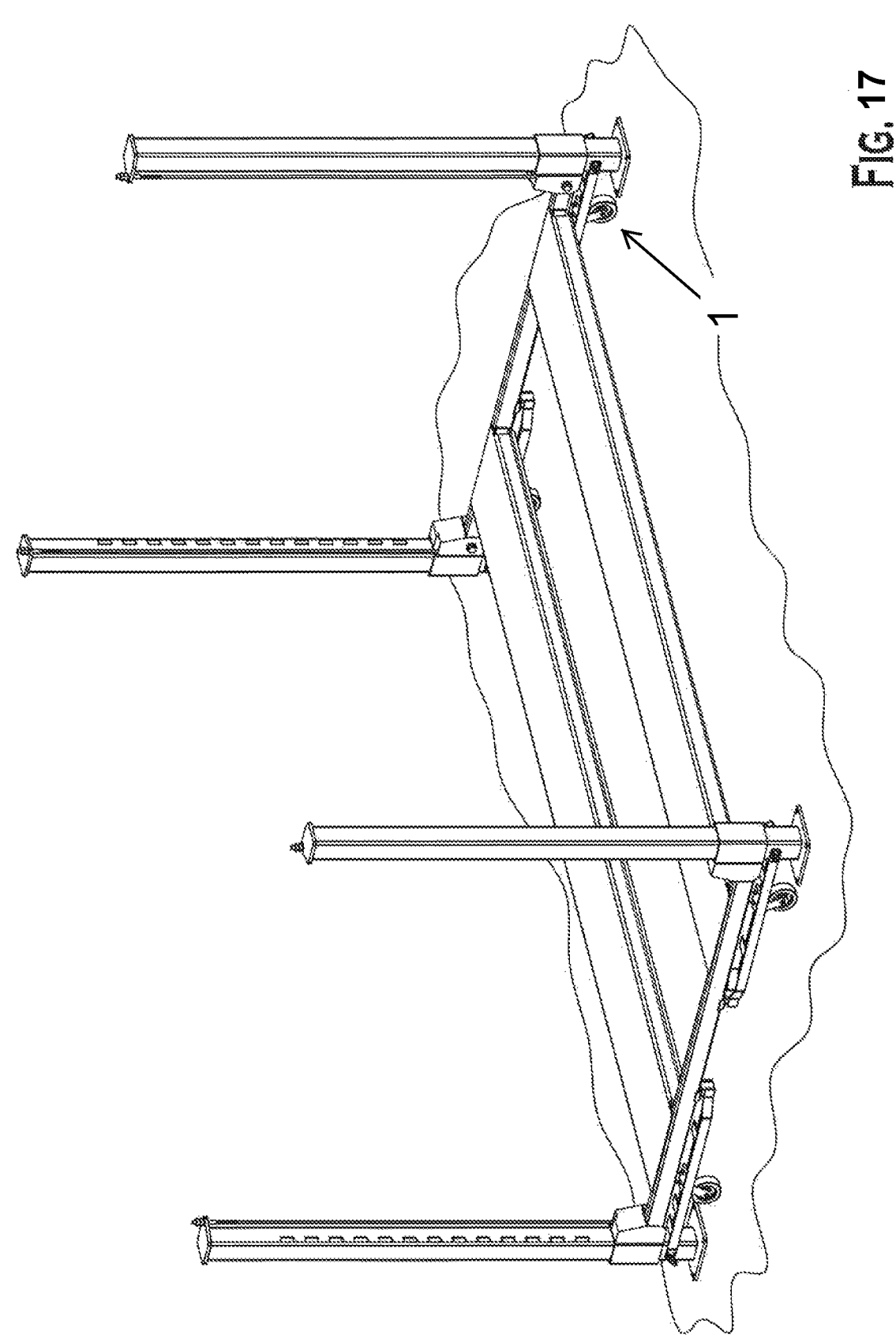
FIG. 17 is another perspective view of the invention of FIG. 16.
Figure 18:
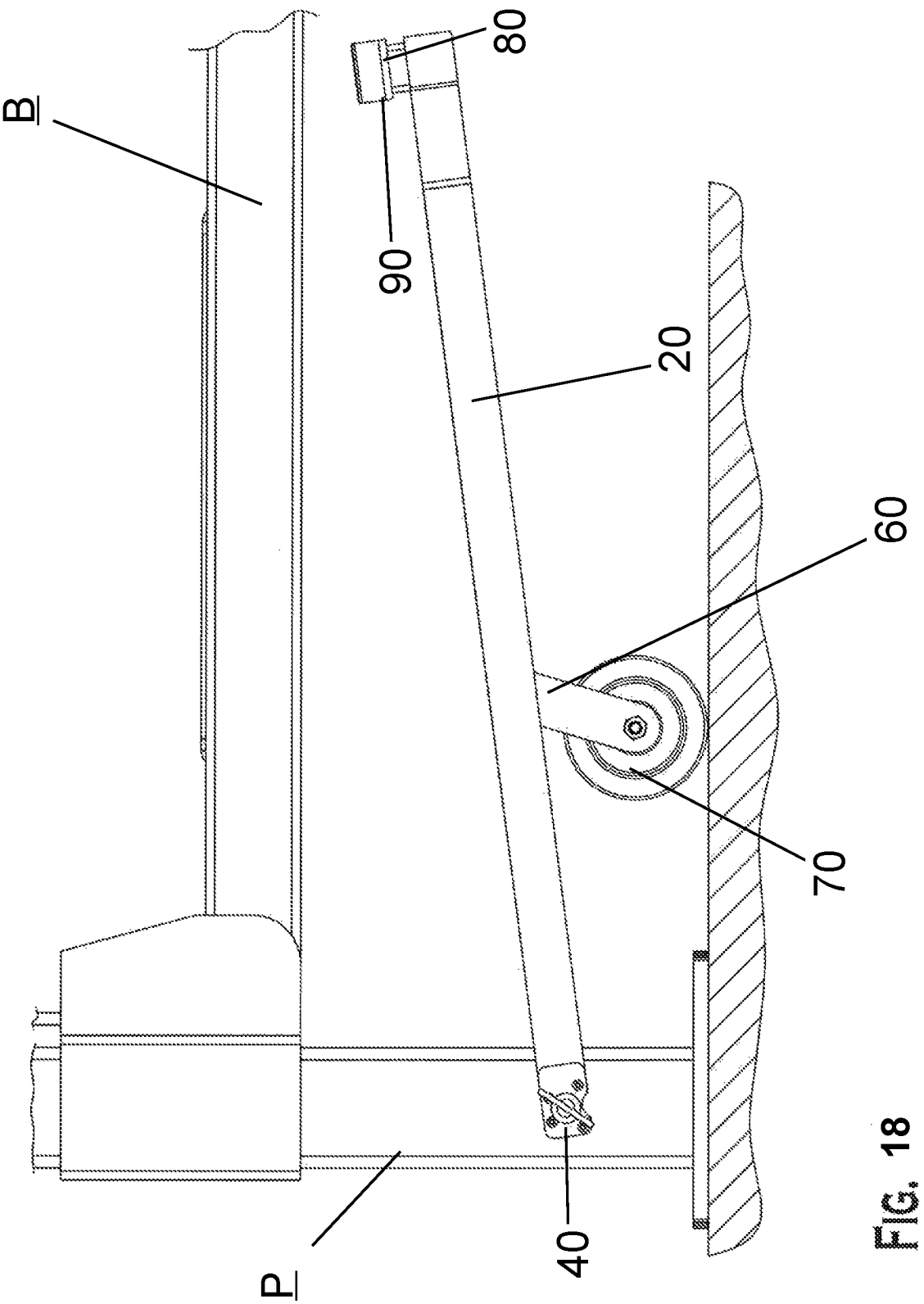
FIG. 18 is a right side view of the invention of FIG. 17.
Figure 19:
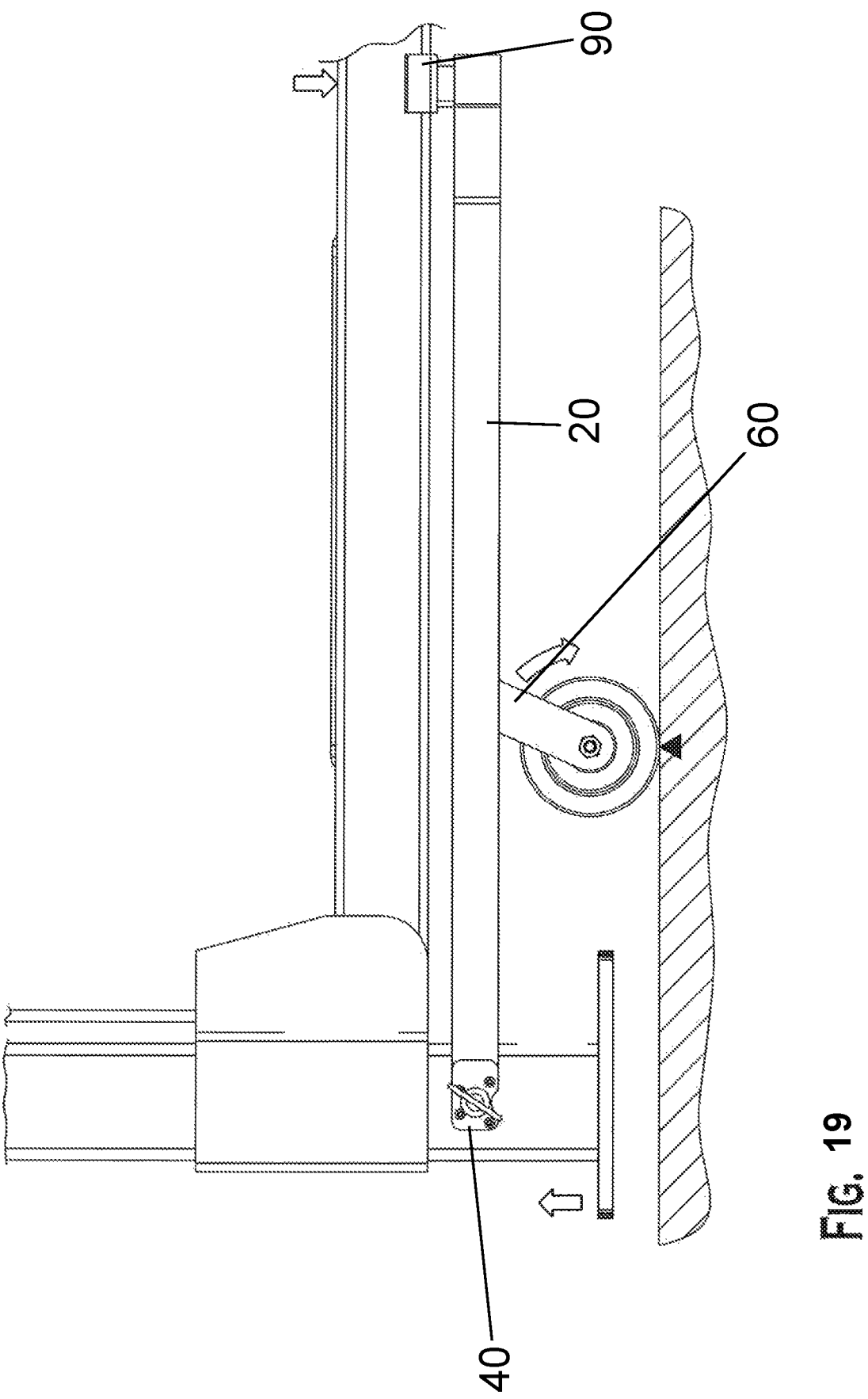
FIG. 19 is a right side view of the invention of FIG. 18.
Figure 20:
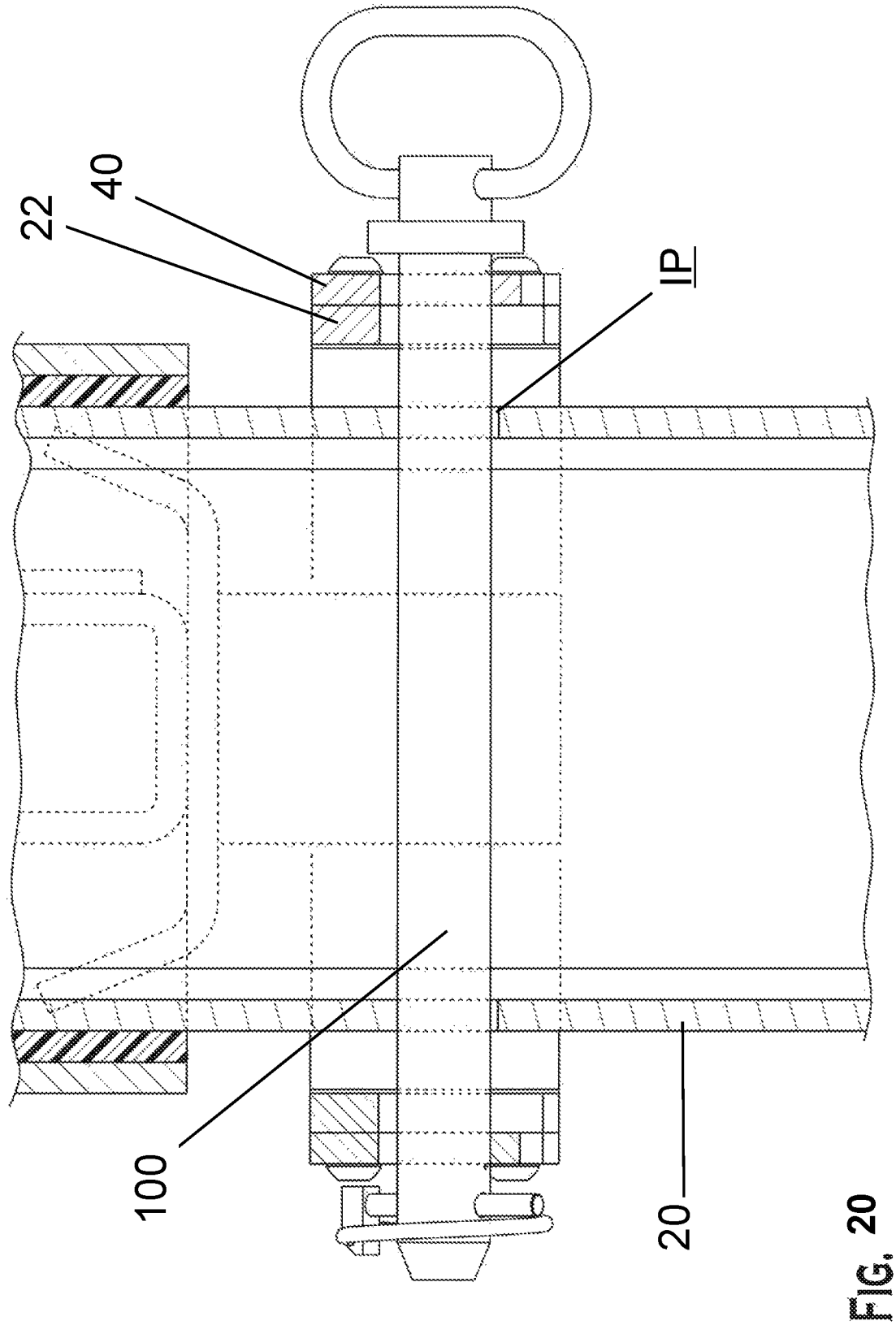
FIG. 20 is a cross sectional view of the invention of FIG. 19.
Figure 21:
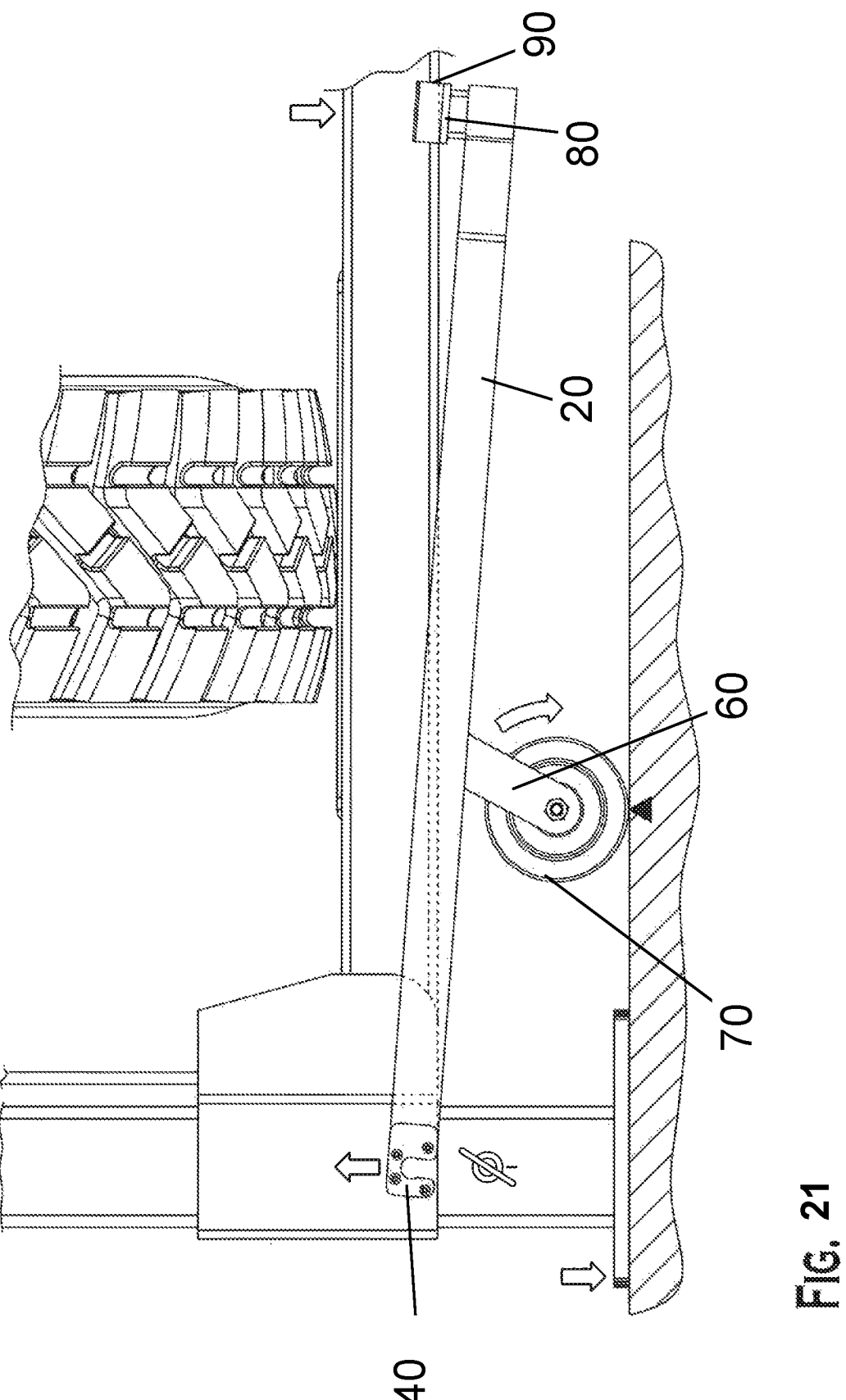
FIG. 21 is a right side view of the invention of FIG. 20.
Figure 22:
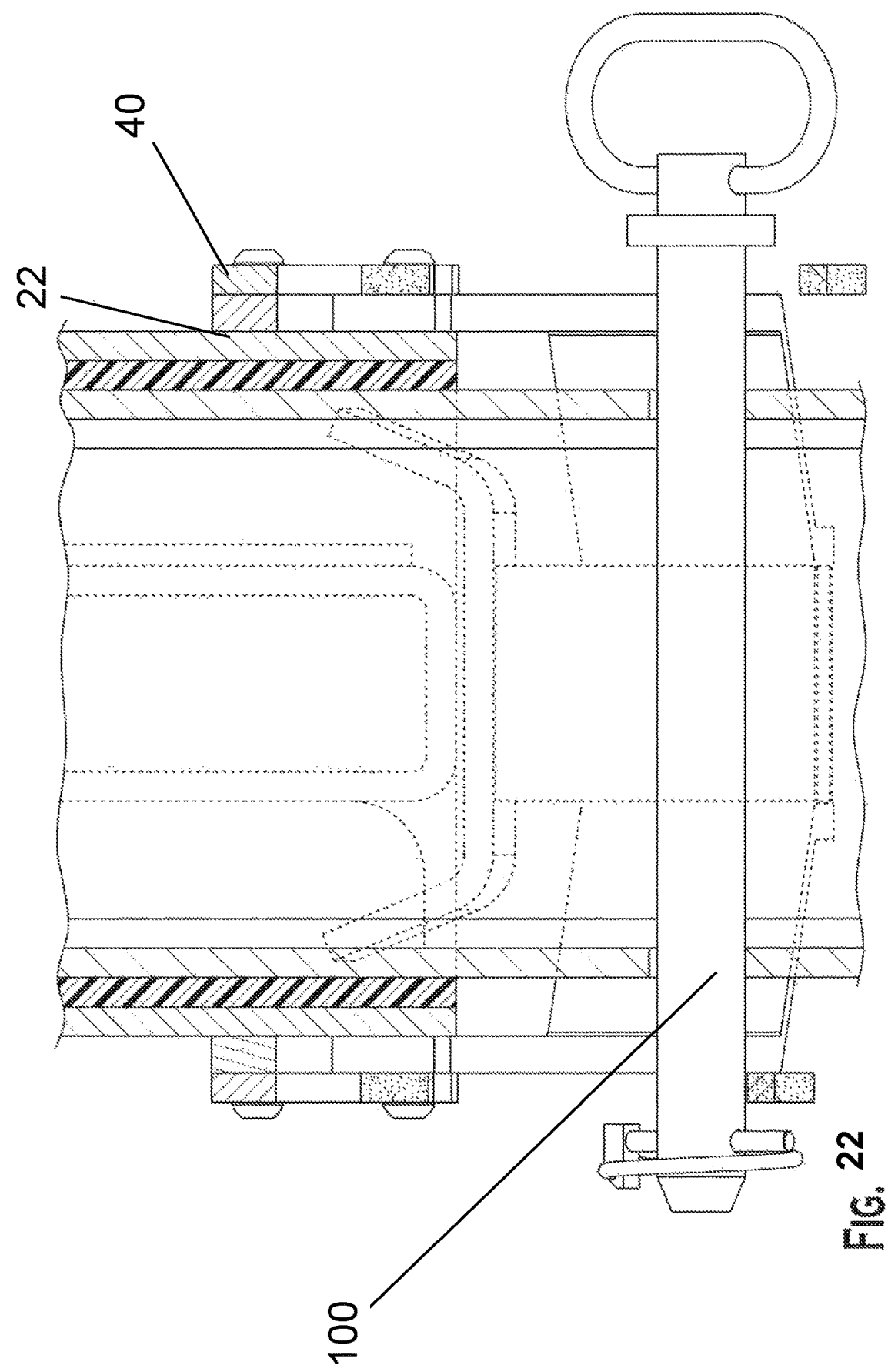
FIG. 22 is a cross sectional view of the invention of FIG. 21.
Figures 23, 24:
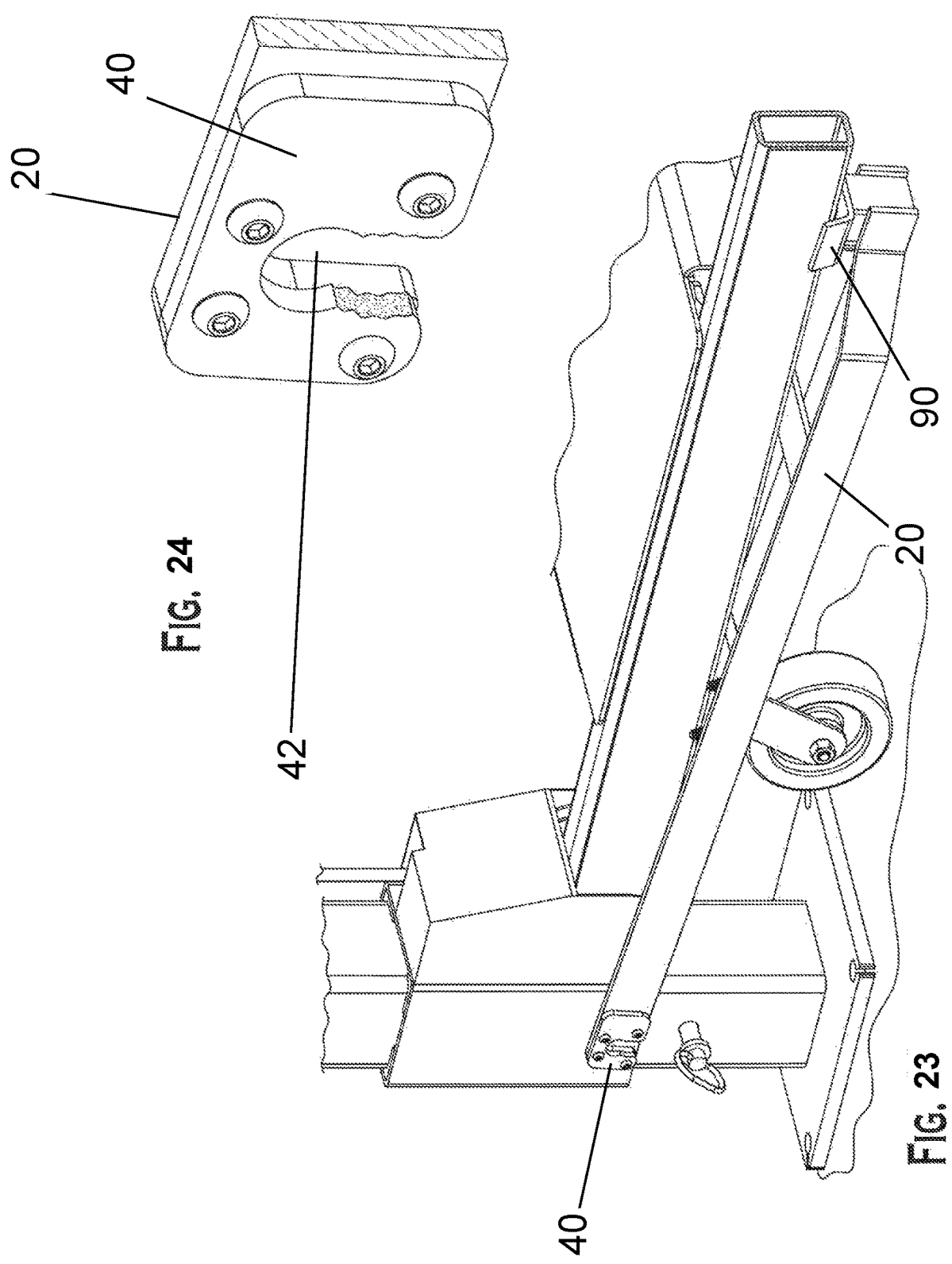
FIG. 23 is front, right side, top view of the invention of FIG. 22.
FIG. 24 is an isolation view of the invention of FIG. 23.
Figures 25, 26:
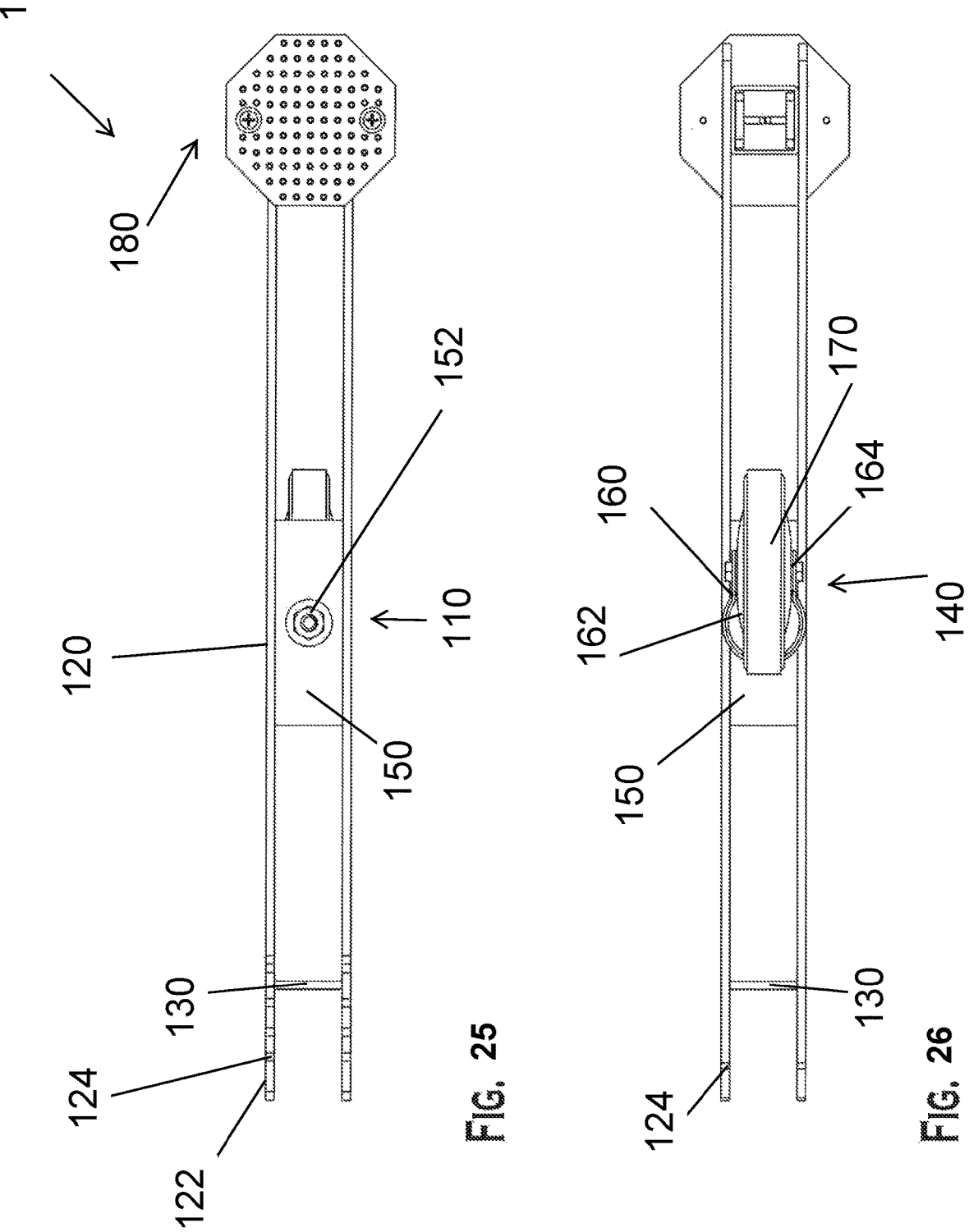
FIG. 25 is an alternate embodiment top side view of FIG. 24.
FIG. 26 is a bottom side view of FIG. 25.
Figures 27, 28:
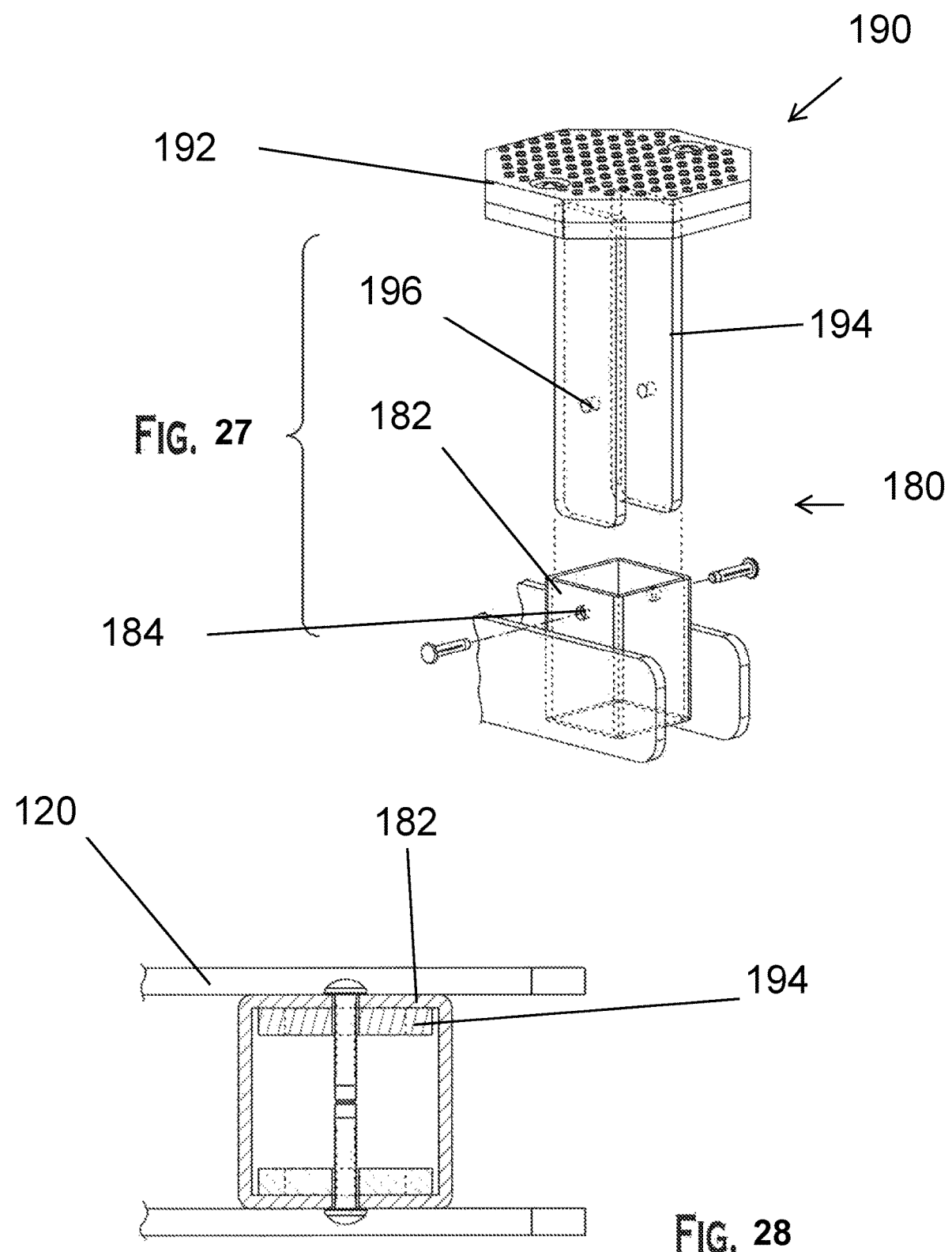
FIG. 27 is an isolation view of FIG. 26.
FIG. 28 is a cross sectional view of FIG. 27.
Figures 29, 30:
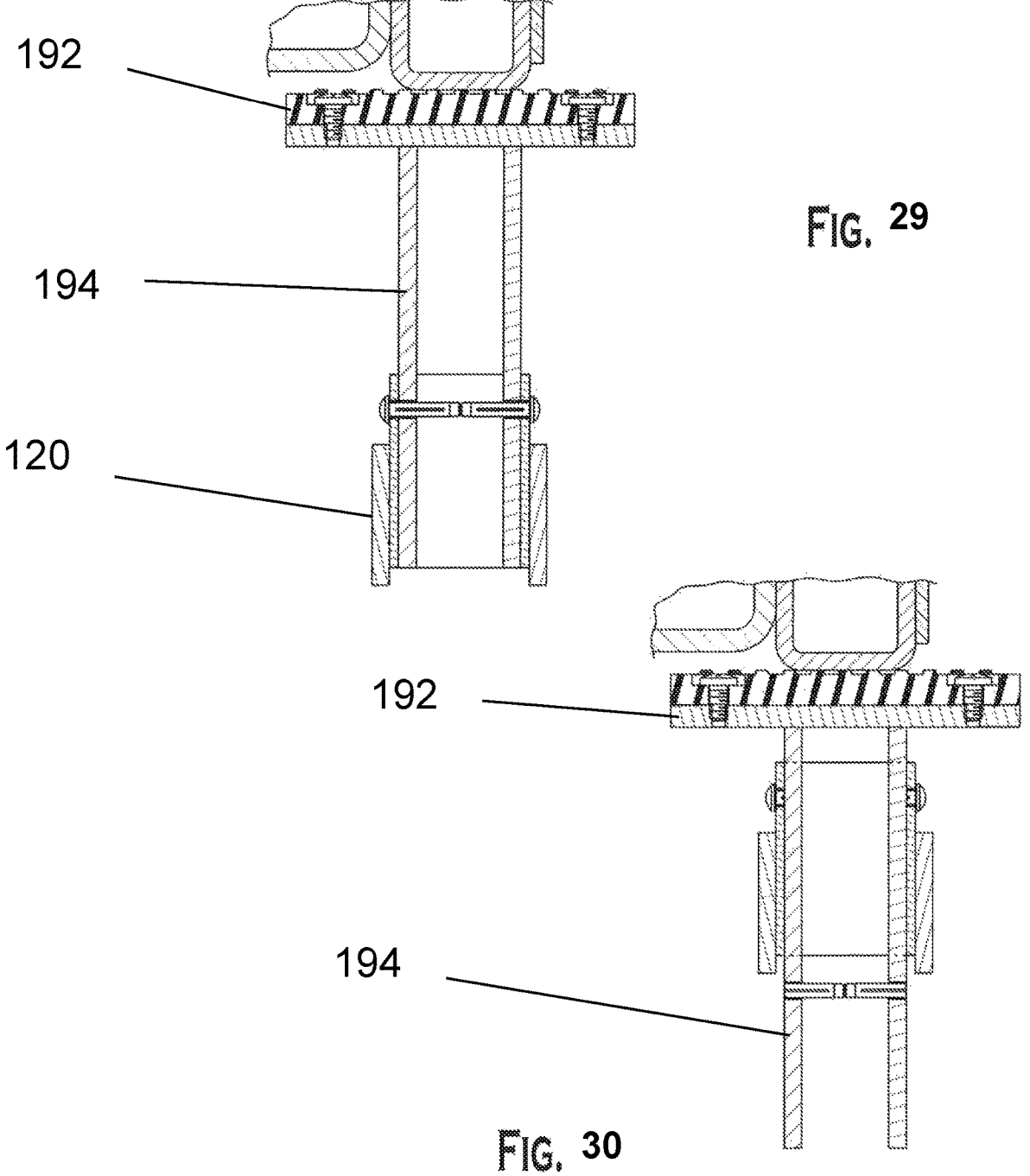
FIG. 29 is a cross sectional view of FIG. 28.
FIG. 30 is a cross sectional view of FIG. 29.
Figures 31, 32:
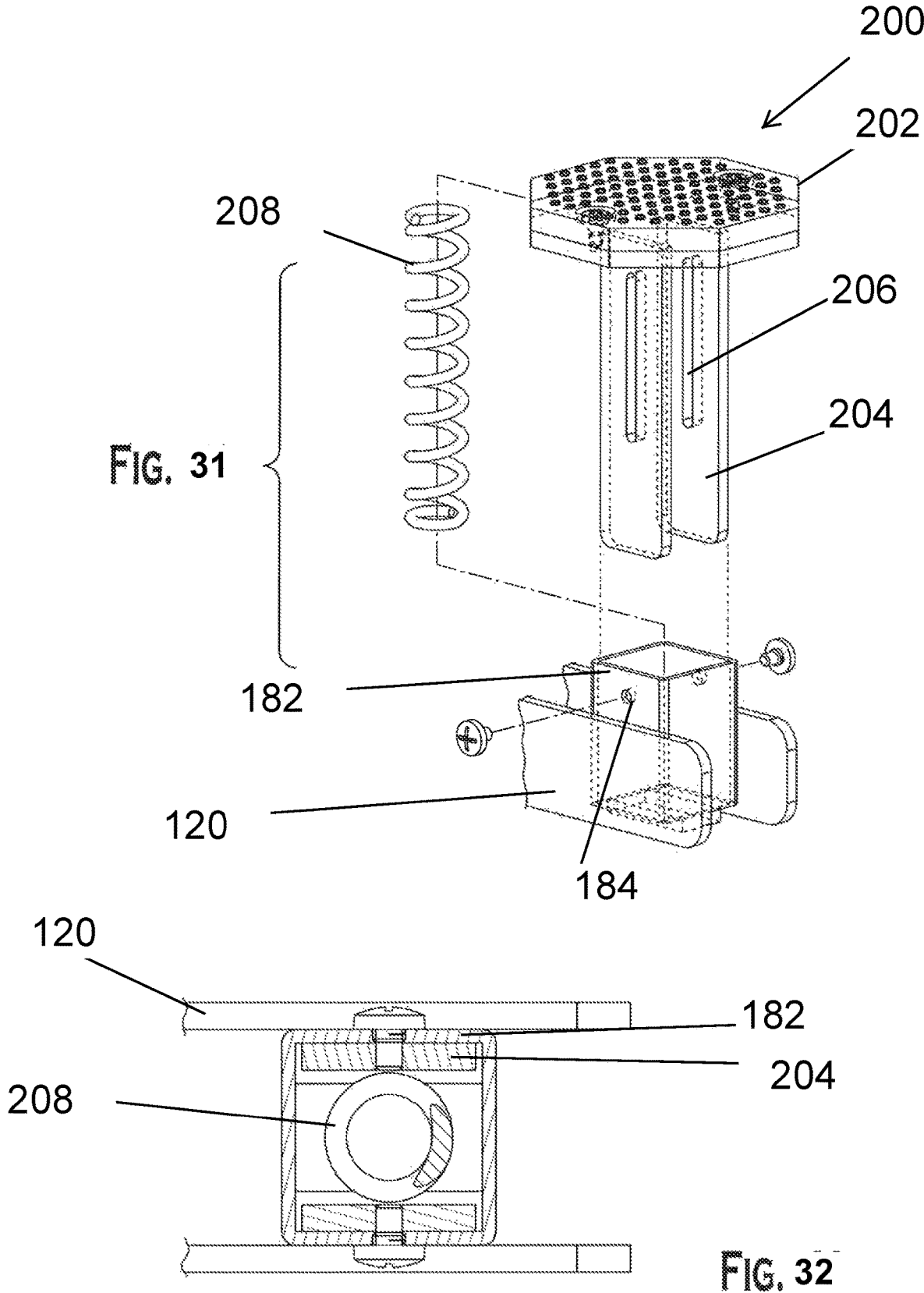
FIG. 31 is an alternate embodiment exploded view of FIG. 30.
FIG. 32 is a cross sectional view of the invention of FIG. 31.
Figures 33, 34:
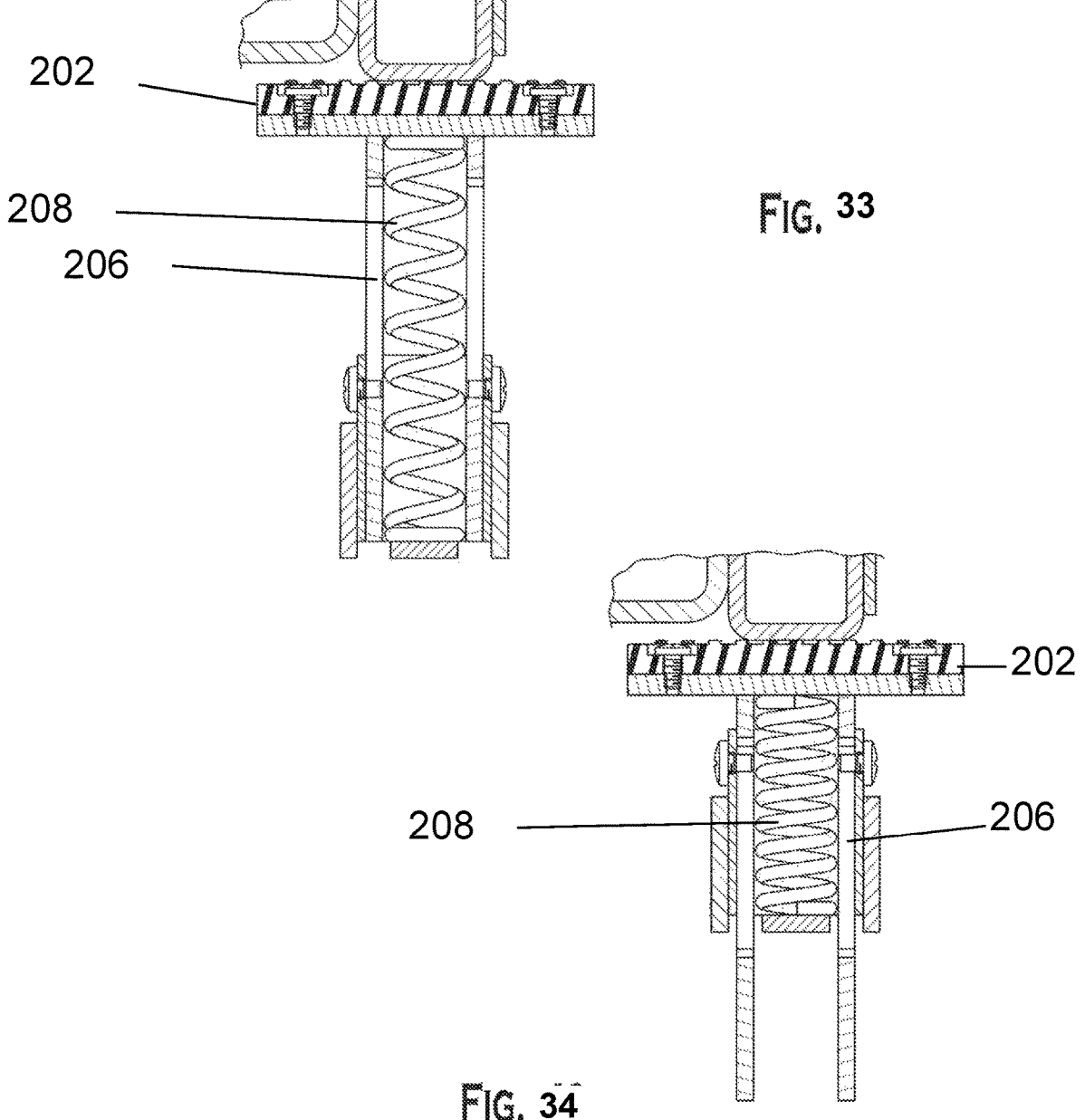
FIG. 33 is a cross sectional view of the invention of FIG. 32.
FIG. 34 is another cross sectional view of the invention of FIG. 33.
Figure 35:
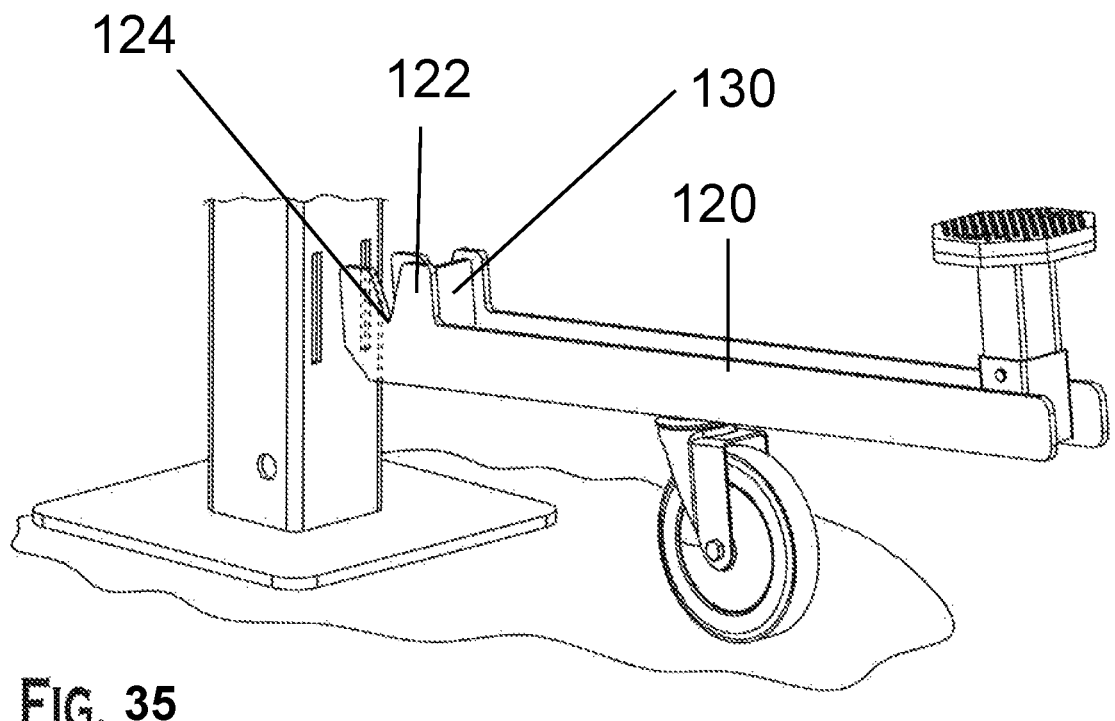
FIG. 35 is a front, top, right side view of the invention of FIG. 34.
Figure 36:
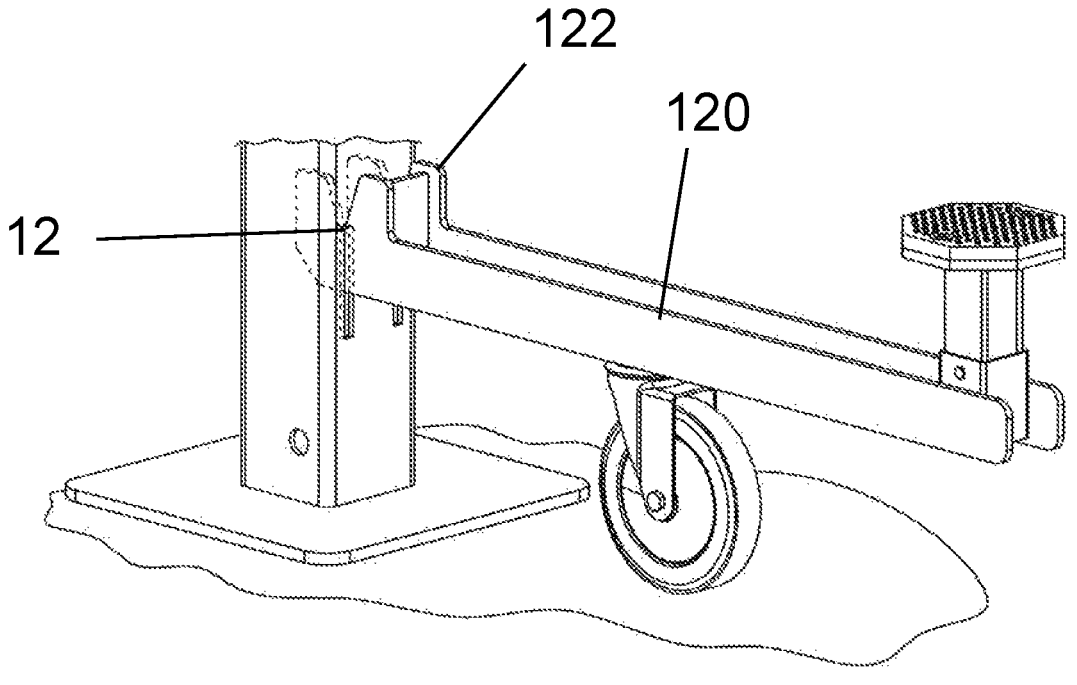
FIG. 36 is a front, top, right side view of the invention of FIG. 35.
Figure 37:
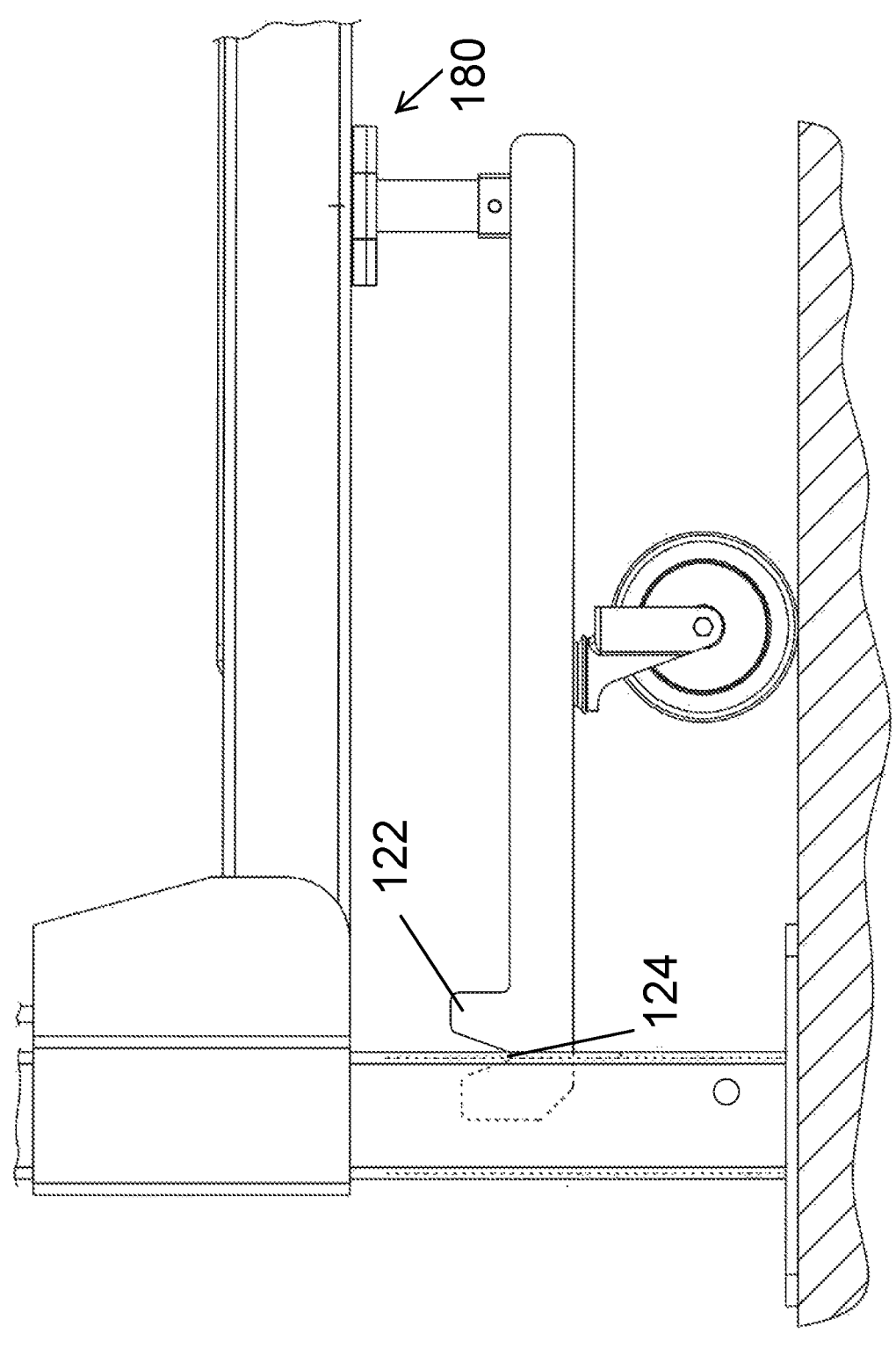
FIG. 37 is a right side view of the invention of FIG. 36.
Figure 38:
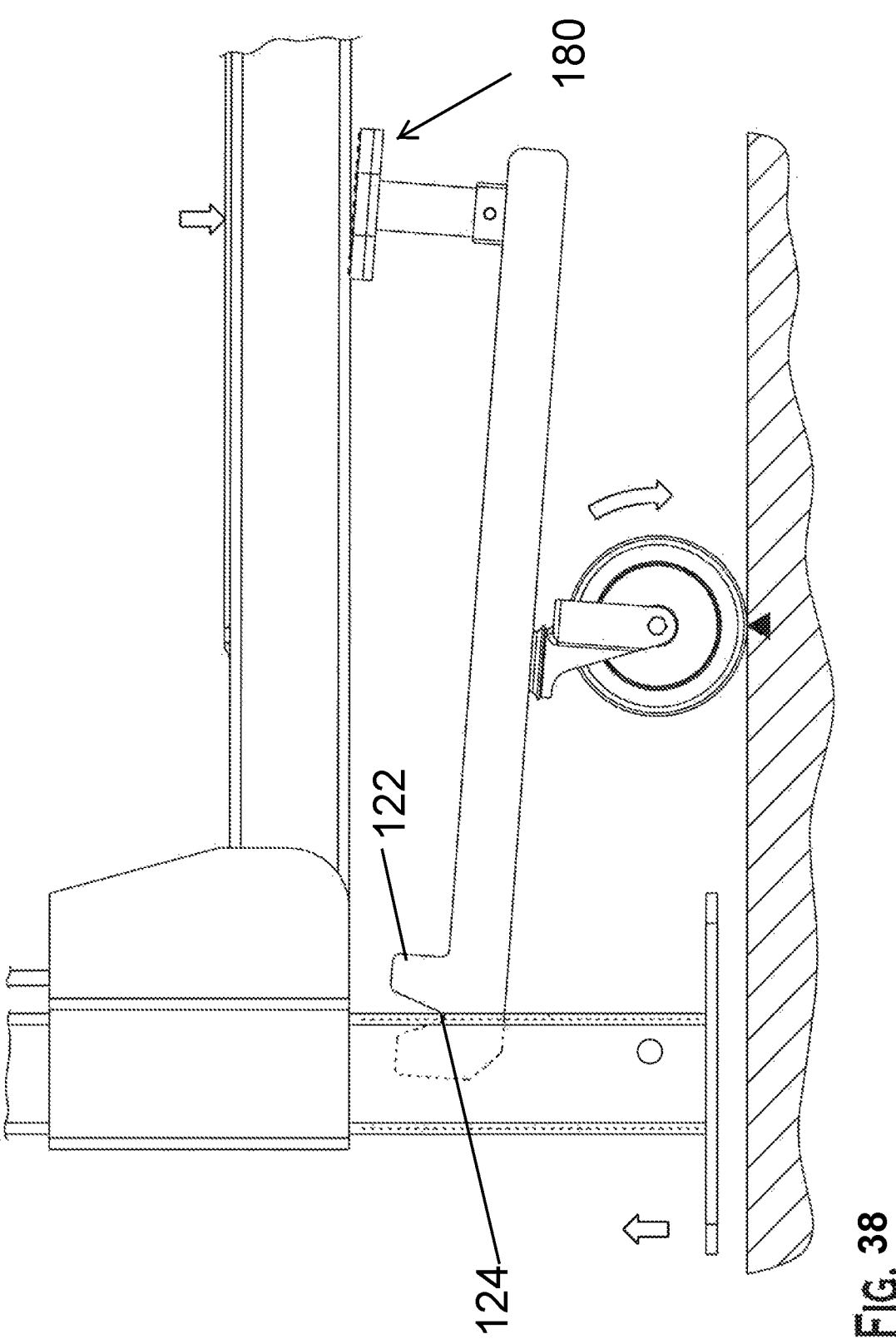
FIG. 38 is a right side view of the invention of FIG. 37.
Figure 39:
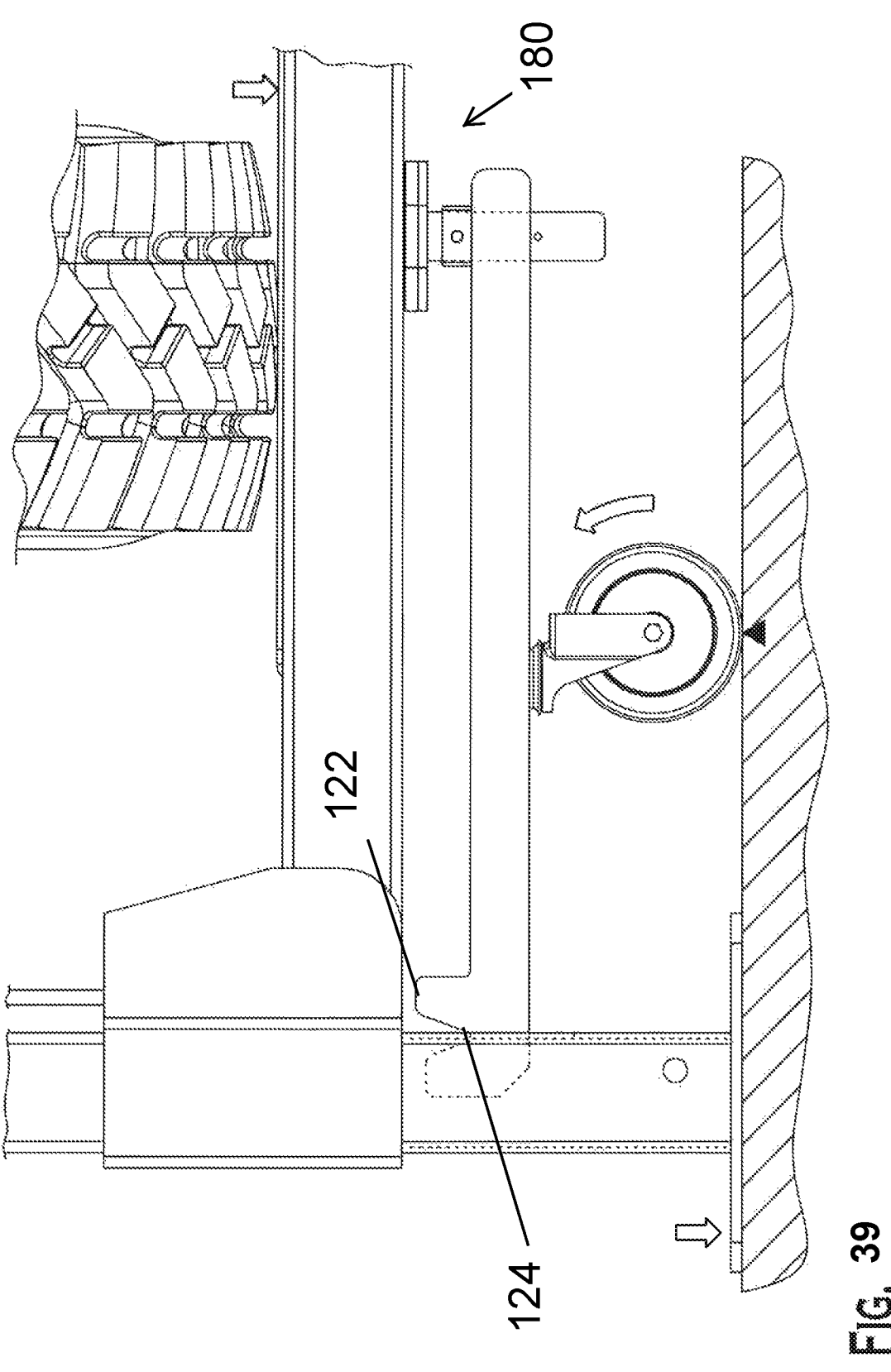
FIG. 39 a right side view of the invention of FIG. 38.

In the exemplary embodiment, the beam assembly 2 generally has a pair of side plates 20, and a plurality of cross section plates 30 as illustrated in FIG. 2.

As illustrated in FIG. 2, each side plate 20 is an elongated metal support. A front end of each side plate is tapered inwards to form a bottleneck structure. Each side plate 20 further includes a slot 22. The slot 22 is a semicircular passageway positioned at a rear end of each side plate 20 of the pair of side plates 20 and extends therethrough.

As illustrated in FIG. 3, each cross section plate 30 is a rectangular member. One skilled in the art would understand the applicant's design is not the exclusive embodiment.

In the exemplary embodiment, the safety mechanism assembly 4 includes a pair of shear plates 40. Each shear plate 40 of the pair of shear plates 40 is a thin section of material. Each shear plate 40 further includes a bolt receiver 42 which extends therethrough. Each shear plate 40 further includes a plurality of fastener passageways 44 positioned around the bolt receiver 42.

In the exemplary embodiment, the wheel assembly 6 generally has a structural plate 50, a wheel support 60 and a wheel 70.

As illustrated, the structural plate 50 is a metal sheet like member. The structural plate 50 further includes a plurality of fastener connectors 52 positioned at each edge of the structural plate 50. One skilled in the art would understand the applicant's design is not the exclusive embodiment.

As illustrated, the wheel support 60 is a plate member with a pair of legs extending downwards. The wheel support 60 further includes a plurality of receiver ports 62 positioned at each edge of the wheel support 60, parallel to the plurality of fastener connectors 52. The wheel support 60 further includes an axel connector 64 positioned at a lower portion of the wheel support 60.

As illustrated, the wheel 70 is a free float wheel. The wheel 70 is composed of a hard plastic material.

In the exemplary embodiment, the structural cradle assembly 8 has a mount 80 and a cradle 90.

As illustrated, the mount 80 is a box like structural support. The mount 80 further includes a mount connector 82 positioned in the central region of the mount 80 flush with the cradle 90.

As illustrated, the cradle 90 is a U-shaped member. The cradle 90 further includes a cradle connector 92. The cradle connector 92 is positioned in the central region of the cradle 90 and parallel to the mount connector 82. The cradle 90 further includes a lift receiver 94 which is formed by the u-shape structure of the cradle 90.

In the exemplary embodiment, the fastener assembly 10 is a bolt or pin 100. One skilled in the art would understand the applicant's design is not the exclusive embodiment.

As assembled, in the exemplary embodiment, the pair of side plates 20 are positioned parallel to each other. The plurality of cross section plates 30 are positioned and coupled perpendicular to the pair of side plates 20. The structural plate 50 of the wheel assembly 6 is coupled to the pair of side plates 20. The structural plate 50 is positioned between two of the cross section plates 30 and is perpendicular to the pair of side plates 20.

Each of the shear plates 40 along with their bolt receivers 42 are positioned on an outer edge of each of the side plates 20 and aligned with each slot 22. A plurality of fasteners is inserted through the plurality of fastener passageways 44 and coupled to each side plate 20.

The wheel support 60 is positioned and coupled to a bottom of the structural plate 50 by the plurality of receiver ports 62 and the plurality of fastener connectors 52. The wheel 70 is coupled to the axel connector 64 of the wheel support 60.

As illustrated a width of the safety caster assembly 1 from each shear plate 40 of the pair of shear plates 40 is about 7.13 inches+/−1/16". In another embodiment, a width of the safety caster assembly 1 from each shear plate 40 of the pair of shear plates 40 is about 7.13 inches+/−0.03". In another embodiment, a width of the safety caster assembly 1 from each shear plate 40 of the pair of shear plates 40 is about 7.13 inches+/−0.015". In another embodiment, a width of the safety caster assembly 1 from each shear plate 40 of the pair of shear plates 40 is about 7.13 inches+/−0.0005".

As illustrated a length of the safety caster assembly 1 is about 46.19 inches+/−1/16". In another embodiment, a length of the safety caster assembly 1 is about 46.19 inches+/−0.03". In another embodiment, a length of the safety caster assembly 1 is about 46.19 inches+/−0.015". In another embodiment, a length of the safety caster assembly 1 is about 46.19 inches+/−0.0005".

As illustrated a height of the safety caster assembly 1 is about 11.14 inches+/−1/16". In another embodiment, a height of the safety caster assembly 1 is about 11.14 inches+/−0.03". In another embodiment, a height of the safety caster assembly 1 is about 11.14 inches+/−0.015". In another embodiment, a height of the safety caster assembly 1 is about 11.14 inches+/−0.0005".

As illustrated, in the exemplary embodiment of the safety caster assembly 1, each of the shear plates 40 of the pair of shear plates 40 and the slot 22 of each side plate 20 are positioned on the outside of a post P of an automobile lift. Specifically, each shear plate 40 and each of the slots 22 are in line with an insertion passageway IP of the post P. The fastener assembly 10 is inserted through each of the shear plates 40, the slots 22 and the insertion passageway IP of the post P. As shown, the slot 22 allows the fastener assembly 10 to float. The safety caster assembly 1 is attached to each post P of the automobile lift AL.

As shown, the cradle 90 is positioned directly under the automobile lift. An operator lowers the automobile lift and positions the automobile lift beam B on the lift receiver 94. The automobile lift beam B provides a force in a first position to the cradle 90. Specifically, a downwards force is applied to the cradle 90. The wheel assembly 6 acts like a fulcrum. A front portion of the safety caster assembly 1 descents in a first position while a rear portion of the safety caster assembly 1 elevates in a second position lifting the post P upwards.

The force is applied to the fastener assembly 10. The pair of shear plates 40 support ¼ the weight of the entire automobile lift. The pair of shear plates 40 however deform and break if a total weight of the automobile lift exceeds 2000 pounds, or the weight applied to the pair of shear plates 40 exceeds 500 pounds. If the shear plate 40 breaks, the operator can couple a new shear plate 40 to each side plate 20. If the shear plate 40 does not deform and break, the operator is able to transport the automobile lift.

In an alternate embodiment, the safety caster assembly 1' has a beam assembly 110, a wheel assembly 140, and a platform assembly 180.

As illustrated, the beam assembly 110 generally has a pair of side plates 120, and a cross section plate 130.

As shown, each side plate 120 is an elongated metal support. A front end of each side plate 120 of the pair of side plates 120 receive the platform assembly 180. A rear end of each side plate 120 includes two sets of teeth like members 122. Each side plate 120 further includes an insert receiver 124 positioned and formed between the pair of teeth like members 122.

As illustrated, the cross section plate 130 is a rectangular member positioned perpendicular to one set of the teeth like members 122. One skilled in the art would understand the applicant's design is not the exclusive embodiment.

As illustrated, the wheel assembly 140 generally has a structural plate 150, a wheel support 160 and a wheel 170.

As illustrated, the structural plate 150 is a metal sheet like member. The structural plate 150 further includes a fastener connector 152 positioned in the central region of the structural plate 150. One skilled in the art would understand the applicant's design is not the exclusive embodiment.

As illustrated, the wheel support 160 is a plate member with a pair of legs extending downwards. The wheel support 160 further includes a plurality of receiver ports 162 positioned at an upper end of the wheel support 160. The wheel support 160 further includes an axel connector 164 positioned at a lower end of the wheel support 160.

As illustrated, the wheel 170 is a free float wheel. The wheel 170 is composed of a hard plastic material.

As illustrated, the platform assembly 180 includes a mount 182. The mount 182 is a box like structural support. The mount 182 further includes a mount connector 184 positioned in an upper region of the mount 182.

The platform assembly 180 further includes a platform 190. The platform 190 includes an octagonal base 192. The platform 190 further includes a pair of connecting beams 194 positioned and extending from a bottom portion of the octagonal base 192. Each of the connecting beams 194 further includes a receiving passageway 196.

In an alternate embodiment of the platform 190. The alternative platform 200 includes an octagonal base 202. The alternative platform 200 further includes a pair of connecting beams 204 positioned and extending from a bottom portion of the octagonal base 202. Each pair of connecting beams 204 further includes a sliding receiver 206. The sliding receiver 206 is a cylindrical passageway extending along a central region of each connecting beam 204 of the pair of connecting beams 204. The alternative platform 200 further includes a spring 208 positioned in between the pair of connecting beams 204 as shown.

In the alternate embodiment of the safety caster assembly 1', the pair of side plates 120 are positioned parallel to each other. The cross section plate 130 is positioned between one set of the teeth like members 122. The structural plate 150 is positioned in the central region and along the pair of side plates 120. The wheel support 160 is positioned and coupled to a bottom portion of the structural plate 150 by the plurality of receiver ports 162 and the fastener connector 152. The wheel 170 is coupled to the axel connector 164 of the wheel support 160. The mount 182 is positioned between the side plates 120. The pair of connecting beams 194 are positioned within the mount 182 and secured by a coupler running through the mount connector 184.

In the alternate embodiment, the alternative platform 200, includes the mount 182 positioned between the side plates 120. The spring 208 is positioned in between the pair of connecting beams 204. Each of the connecting beams 204 are then positioned within the mount 182 and a pair fasteners are fed into the mount connector 184 and the sliding receiver 206.

In the alternate embodiment, the pair of teeth like members 122 are positioned within a receiver of the post P. The platform assembly 180 is positioned directly under the automobile lift beam B. In an embodiment, the automobile lift beam is lowered and provides a force in a first position to the platform assembly 180. Specifically, a downwards force is applied to the platform 190. The wheel assembly 140 acts like a fulcrum. A front portion of the safety caster assembly 1' descents in a first position while a rear portion of the safety caster assembly 1' elevates in a second position raising the post P.

In another embodiment, the alternative platform 200 with the addition of the spring 208 permits the alternative platform 200 to descent and raise by the sliding receiver 206 on each of the connecting beams 204 of the pair of connecting beams 204.

It should be noted that various changes and modifications to the embodiments described herein will be apparent to those skilled in the art. Such changes and modifications may be made without departing from the spirit and scope of the present invention and without diminishing its intended advantages. For example, various embodiments of the assembly and methods may be provided based on various combinations of the features and functions from the subject matter provided herein.

What is claimed is:

1. A safety caster assembly comprising:
    a beam assembly having:
        a pair of side plates, each side plate of the pair of side plates having a slot; and
        a plurality of cross section plates; and
    a safety mechanism assembly having:
        a pair of shear plates and each shear plate of the pair of shear plates has a bolt receiver corresponding to the slot; and
    a wheel assembly having:
        a structural plate positioned between each side plate of the pair of side plates; and
        a wheel support positioned and coupled to a bottom of the structural plate; and
        a free floating wheel coupled to a lower portion of the wheel support; and
    a structural cradle assembly having:
        a mount;
        a cradle positioned on the mount; and
        a fastener assembly having a bolt positioned through the bolt receiver and the slot.

2. The safety caster assembly of claim 1, wherein the bolt free floats inside the bolt receiver and the slot.

3. The safety caster assembly of claim 2, wherein the pair of shear plates are positioned at a rear end of each side plate.

4. The safety caster assembly of claim 3, wherein the plurality of cross section plates are positioned perpendicular to the pair of side plates.

5. The safety caster assembly of claim 4, wherein the pair of shear plates, deform when a weight applied exceeds 500 pounds.

6. The safety caster assembly of claim 5, wherein the cradle positioned on the mount forms a lift receiver.

7. The safety caster assembly of claim 6, wherein the bolt receiver is positioned on an outer edge of the pair of side plates.

8. The safety caster assembly of claim 7, wherein the wheel assembly includes a structural plate.

9. The safety caster assembly of claim 8, wherein the wheel assembly further includes a wheel support.

10. The safety caster assembly of claim 9, wherein the wheel support further includes a plurality of receiver ports positioned at each edge of the wheel support.

11. The safety caster assembly of claim 10, wherein the wheel support further includes an axel connector positioned at the lower portion of the wheel support.

12. The safety caster assembly of claim 11, wherein the structural plate is positioned between the pair of side plates.

13. The safety caster assembly of claim 12, wherein the cradle is u-shaped.

14. The safety caster assembly of claim 13, wherein the mount further includes a mount connector.

15. The safety caster assembly of claim 14, wherein the cradle further includes a cradle connector.

16. The safety caster assembly of claim 15, wherein the cradle connector is positioned in a central region of the cradle and parallel to the mount connector.

\* \* \* \* \*